United States Patent
Bang et al.

(10) Patent No.: US 7,483,074 B2
(45) Date of Patent: Jan. 27, 2009

(54) APPEARING AND DISAPPEARING TYPE IMAGE PICKUP DEVICE

(75) Inventors: Yong-seok Bang, Seoul (KR); Yong-il An, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 623 days.

(21) Appl. No.: 11/002,101

(22) Filed: Dec. 3, 2004

(65) Prior Publication Data

US 2005/0141099 A1 Jun. 30, 2005

(30) Foreign Application Priority Data

Dec. 26, 2003 (KR) ...................... 10-2003-0097570

(51) Int. Cl.
*H04N 5/225* (2006.01)
(52) U.S. Cl. ............. 348/373; 348/333.06; 348/333.07; 359/642
(58) Field of Classification Search ................. 348/372, 348/373, 333.06, 333.07; 359/642, 676
See application file for complete search history.

(56) References Cited

U.S. PATENT DOCUMENTS

| | | | | |
|---|---|---|---|---|
| 4,757,388 A * | 7/1988 | Someya et al. | ........... | 348/211.6 |
| 5,659,361 A * | 8/1997 | Jin | .............. | 348/375 |
| 5,983,039 A * | 11/1999 | Aoki | ........... | 396/429 |
| 6,515,705 B1 * | 2/2003 | Fumio et al. | ........... | 348/375 |
| 6,925,254 B2 * | 8/2005 | Kato et al. | ........... | 396/177 |
| 7,146,197 B2 * | 12/2006 | Kang et al. | ........... | 455/575.1 |
| 7,194,290 B2 * | 3/2007 | Matsunami | ........... | 455/575.1 |
| 7,202,901 B1 * | 4/2007 | Hattori et al. | ........... | 348/333.06 |
| 2001/0004269 A1 * | 6/2001 | Shibata et al. | ........... | 348/333.06 |
| 2001/0009439 A1 * | 7/2001 | Hwang | ........... | 348/232 |
| 2002/0067425 A1 * | 6/2002 | Iverson | ........... | 348/373 |
| 2003/0220145 A1 * | 11/2003 | Erickson et al. | ........... | 463/47 |
| 2004/0004667 A1 * | 1/2004 | Morikawa et al. | ........... | 348/333.06 |
| 2004/0080667 A1 * | 4/2004 | Jeong et al. | ........... | 348/374 |
| 2004/0165106 A1 * | 8/2004 | Nakagawa | ........... | 348/373 |
| 2005/0020325 A1 * | 1/2005 | Enger et al. | ........... | 455/575.3 |
| 2005/0078211 A1 * | 4/2005 | Whitehorn et al. | ........... | 348/376 |
| 2006/0050168 A1 * | 3/2006 | Okada et al. | ........... | 348/333.06 |

* cited by examiner

*Primary Examiner*—Tuan Ho
*Assistant Examiner*—Quang V Le
(74) *Attorney, Agent, or Firm*—Roylance, Abrams, Berdo & Goodman, LLP

(57) ABSTRACT

An appearing and disappearing type image pickup device having a lens unit and/or a terminal connection unit mounted to be capable of selectively appearing and disappearing in relation to a main body of the image pickup device so that the image pickup device can be used as a multipurpose device. The image pickup device comprises a lens unit for capturing an image of an object, a main body receiving the lens unit in one end of the main body to be capable of appearing and disappearing, an image outputting unit provided at one side of the main body, a recording unit provided in the main body, and a battery installed in the main body for supplying power to the respective components of the image pickup device. To provide the desired functions, the lens unit comprises a slidable moving unit which is capable of appearing and disappearing in relation to the main body, and a rotary unit mounted to be rotatable in forward, reverse, up and/or down directions in relation to the moving unit within a predetermined range of angles.

14 Claims, 9 Drawing Sheets

APPEARING AND DISAPPEARING TYPE IMAGE PICKUP DEVICE

CROSS-REFERENCE TO RELATED APPLICATIONS

This application claims the benefit under 35 U.S.C. §119(a) of Korean Patent Application No. 2003-97570 filed in the Korean Intellectual Property Office on Dec. 26, 2003, the entire contents of which are incorporated herein by reference.

BACKGROUND OF THE INVENTION

1. Field of the Invention

The present invention relates to an image pickup device for photographing an object. More particularly, the present invention relates to an appearing and disappearing type image pickup device having a lens unit and/or a terminal connection unit that is capable of selectively appearing and disappearing in relation to a main body of the image pickup device in such a way, that the image pickup device can be employed as a multipurpose device.

2. Description of the Related Art

Image pickup devices operate to selectively record a desired scene into a recording medium while viewing an image captured by a lens. Camcorders and cameras are representative examples of such devices. Recently, as image pickup devices have been digitalized through the development of electronic technology, conventional analogue cameras and camcorders have been replaced by digital cameras and digital camcorders. In contrast with conventional analogue appliances, such digital camcorders and the like can be further miniaturized and made to exhibit various functions by being connected to a computer.

However, because the image pickup devices introduced up to now have been focused upon an original function of photographing an object in either moving image or still image, they do not make effective use of various other functions. However, digitalized image pickup devices have the potential to be capable of being used as a PDA, game machine, or MP3 player by using an image outputting unit and a memory, which are essential components of the image pickup devices. If a PDA, game machine and/or MP3 player, which are now widely regarded as necessities by the young consumers of today, are further combined with an image pickup device, a product widely desired by the young consumers of today will be satisfied.

In order to allow an image pickup device to be used for other purposes as described above, the image pickup device should have a main body formed having a shape that can be conveniently handled by a user while performing each desired function. However, conventional image pickup devices are problematic in that, because a lens unit projects from a main body, a user cannot use such image pickup devices for other purposes.

Accordingly, a need exists for an image pickup device having a lens unit which is capable of appearing and disappearing in relation to a main body of the image pickup device.

SUMMARY OF THE INVENTION

Accordingly, the present invention has been made to solve the above-mentioned and other problems. An object of the present invention is to provide an appearing and disappearing type image pickup device having a lens unit mounted to be capable of appearing and disappearing in relation to a main body of the image pickup device. The lens unit can be extended from the main body only when it is required and is normally retracted into the main body, whereby it is very convenient to handle the image pickup device when it is used for a different purpose.

In addition, it is an object of the present invention to provide an appearing and disappearing type image pickup device capable of varying the posture of the image outputting unit, so that the image pickup device can be used as a PDA or the like.

Furthermore, it is an object of the present invention to provide an appearing and disappearing type image pickup device having a lens unit capable of rotating in forward, reverse, up and/or down directions in relation to a main body of the image pickup device while in a state in which the lens unit is extended from the main body. Such rotation allows an increase in the degree of freedom in setting the photographing posture when the device is used as a photographing device.

In order to achieve the above and other objects, an appearing and disappearing type image pickup device is provided comprising a lens unit for capturing an image of an object, a main body for receiving the lens unit in one end of the main body to be capable of appearing and disappearing, an image outputting unit provided at one side of the main body, a recording unit provided in the main body, the image captured by the lens unit being recorded in the recording unit, and a battery installed in the main body for supplying power to the respective components of the image pickup device.

It is preferable that the lens unit is rotatable within a predetermined range of angles about an axis perpendicular to the axis of the lens while in a state in which the lens is extended from the main body, or rotatable within a predetermined range of angles about an axis parallel to the axis of the lens while in a state in which the lens is extended from the main body. It is also preferable that the lens unit is arranged to be capable of automatically appearing and disappearing in relation to the main body.

The image pickup device may further comprise a terminal connection unit mounted in the other end of the main body to be capable of appearing and disappearing. It is also preferable that the terminal connection unit is provided with a DC jack and a computer connection connector.

In addition, the image outputting unit may be opened and closed in relation to the one side of the main body. The image outputting unit is provided at one side of the main body via a hinge which allows the image outputting unit to open from the main body and to then rotate 180 degrees or more in relation to the one side of the main body while in a state in which the image outputting unit is substantially vertically opened in relation to the main body.

The battery is preferably positioned under the image outputting unit while in a state in which the image outputting unit is closed in relation to the main body.

It is also preferable that the other side of the main body is additionally provided with a touch pad which is capable of adjusting a zoom lens of the lens unit.

According to another aspect of the present invention, an appearing and disappearing type image pickup device is provided comprising a lens unit for capturing an image of an object, the lens unit having a zooming function, a main body for receiving the lens unit in one end of the main body to be capable of automatically appearing and disappearing, a terminal connection unit mounted in the other end of the main body to be capable of appearing and disappearing, an image outputting unit provided at one side of the main body, a touch pad provided at the other side of the main body, the touch pad being capable of adjusting the focus of the lens of the lens unit, a recording unit provided in the main body, the image captured by the lens unit being recorded in the recording unit, and a battery installed in the main body under the image outputting unit, the battery supplying power to the respective components of the image pickup device.

The lens unit may comprise a moving unit slidably mounted to be capable of appearing and disappearing in relation to the main body, and a rotary unit mounted to be rotatable in forward, reverse, up and/or down directions in relation to the moving unit within a predetermined range of angles, wherein a lens or zoom lens is installed in the rotary unit to also be rotatable.

In addition, the main body preferably comprises a cursor button arranged to allow a user to grasp the main body and manipulate a cursor displayed on a screen of the image outputting unit while in a state in which the image outputting unit is folded against the main body so that the screen of the image outputting unit is exposed.

As described above, the inventive image pickup device has a lens unit mounted to be capable of appearing and disappearing in relation to the main body of the image pickup device. Accordingly, it is convenient to handle the image pickup device when it is used as a device for different purposes, such as a game machine or PDA.

In addition, because the inventive image pickup device has an image outputting device which is capable of being positioned on the main body with a screen thereof being outwardly exposed, the inventive image pickup device can be used as a game machine, PDA or the like.

Moreover, because the lens unit extended from the inventive image pickup device can be rotated in forward, reverse, up and/or down directions in relation to the main body, the degree of freedom in the photographing posture is increased, thereby allowing more convenient photographing.

BRIEF DESCRIPTION OF THE DRAWINGS

The above aspects and features of the present invention will become more apparent by describing certain embodiments of the present invention with reference to the accompanying drawings, in which.

Throughout the drawings, like reference numerals will be understood to refer to like parts, components and structures.

DETAILED DESCRIPTION OF THE EXEMPLARY EMBODIMENTS

Figure 1:
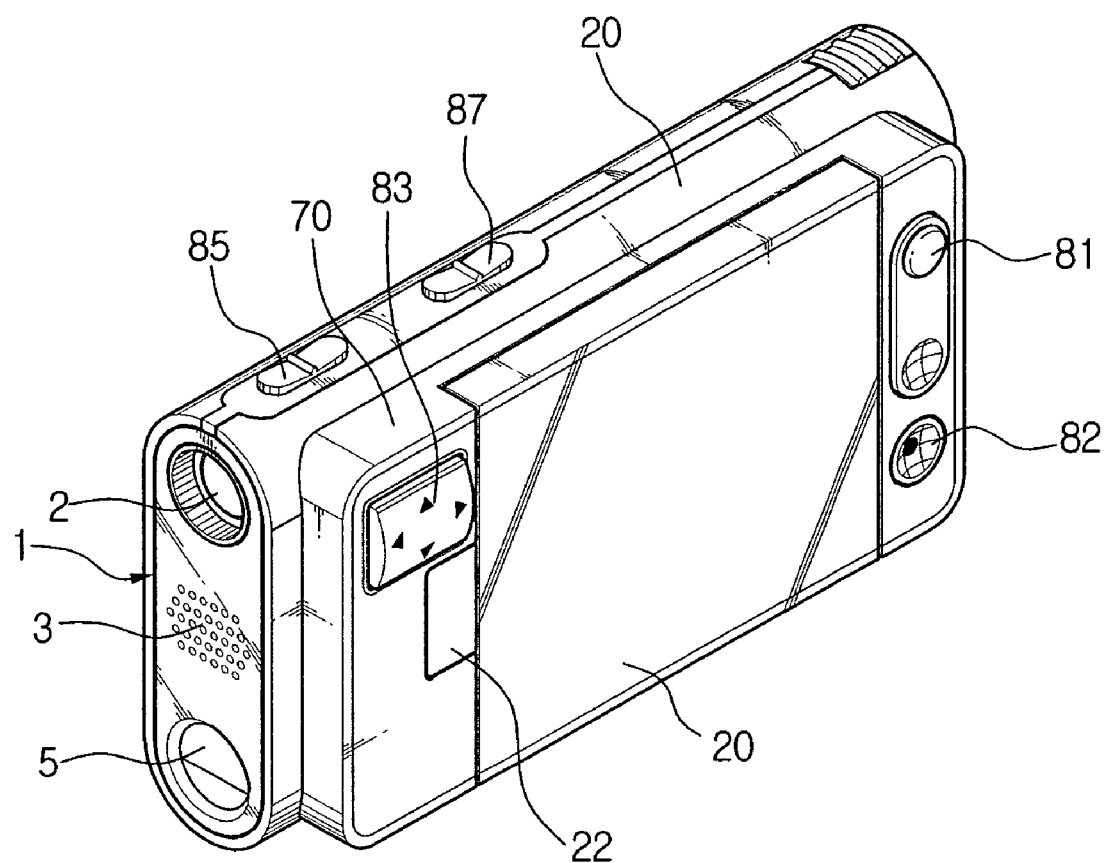
FIG. 1 is a perspective view showing an embodiment of an appearing and disappearing type image pickup device according to an embodiment of the present invention.

Certain exemplary embodiments of the present invention will now be described in greater detail with reference to the accompanying drawings.

In the following description, same drawing reference numerals are used for the same elements even in different drawings. The matters defined in the description, such as a detailed description of constructions and elements, are provided to assist in a comprehensive understanding of the invention. Functions and constructions which are well-known to those skilled in the art are not described since they would obscure the invention in unnecessary detail.

Figure 2:
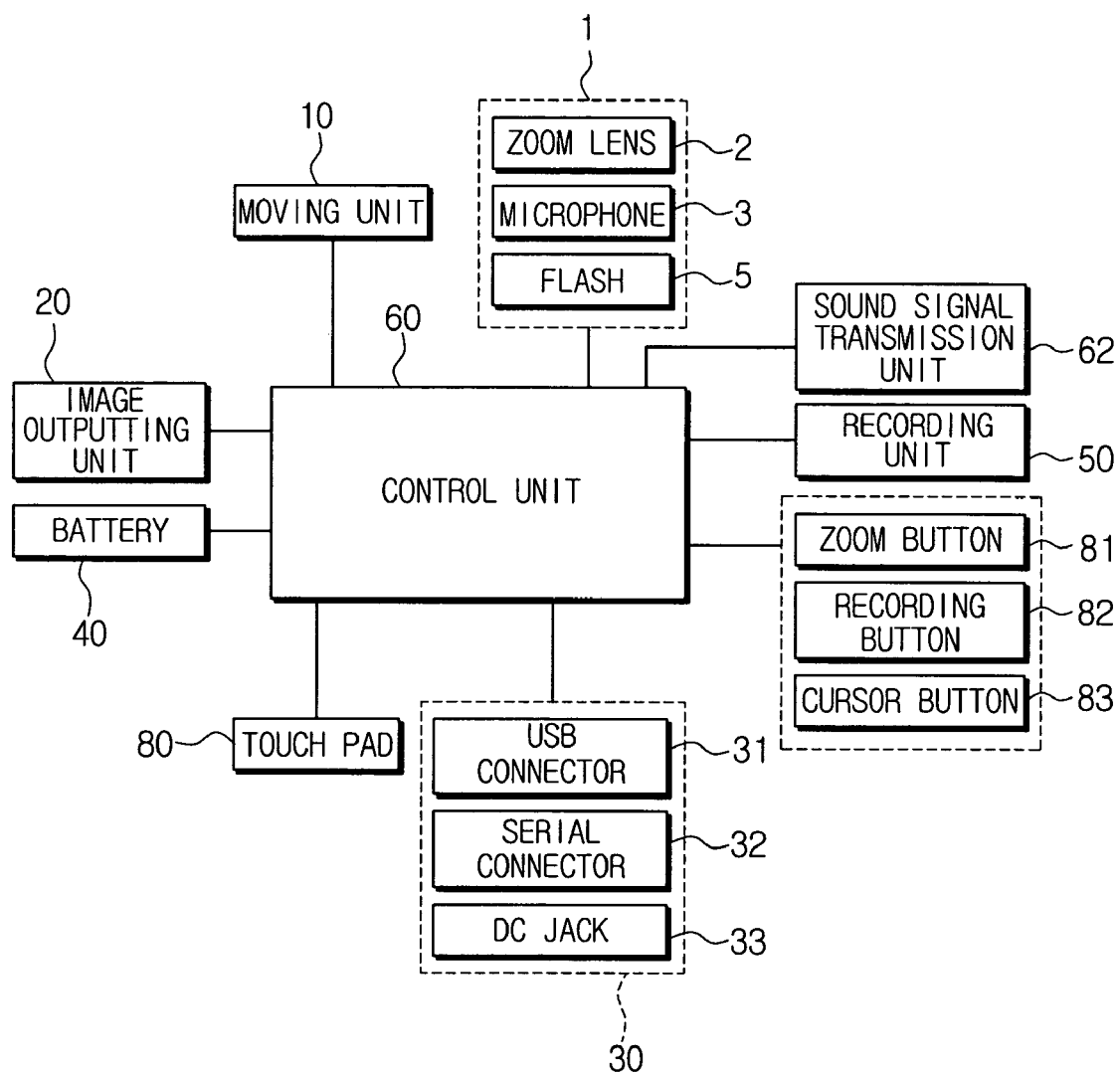
FIG. 2 is a functional block diagram of the appearing and disappearing type image pickup device according to an embodiment of the present invention.

FIG. 1 is a perspective view showing an example of the inventive appearing and disappearing type image pickup device in accordance with an embodiment of the present invention, and FIG. 2 is a functional block diagram thereof.

Referring to FIGS. 1 and 2, the inventive image pickup device comprises a lens unit 1, an image outputting unit 20, a terminal connection unit 30, a battery 40, a recording unit 50, a control unit 60, and a main body 70.

Figure 3:
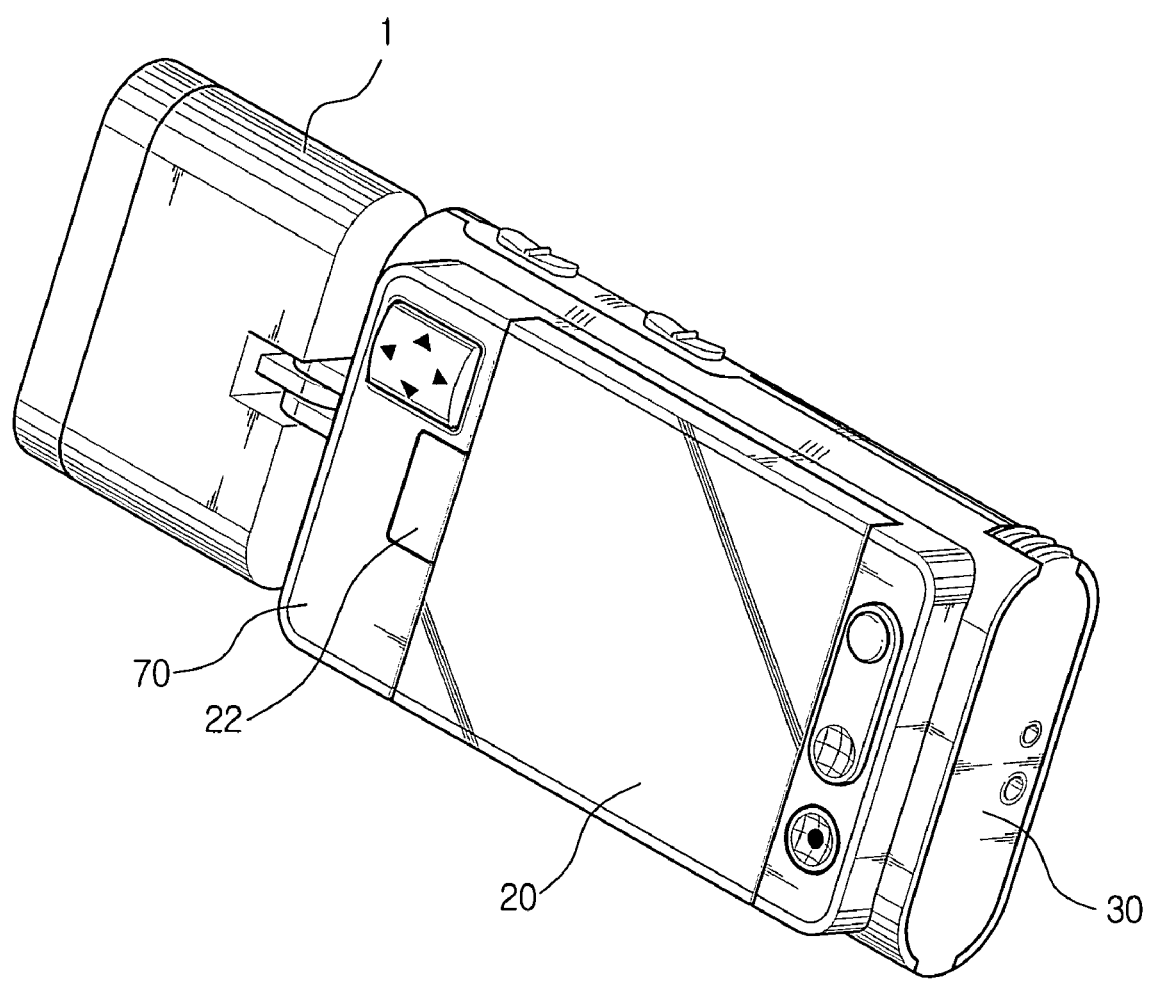
FIG. 3 is a perspective view showing the appearing and disappearing type image pickup device of FIG. 1 while in a state in which a lens unit is extended.

The lens unit 1 is received within the main body 70 so that its front end is not exposed beyond the outside contour of the main body 70. The lens unit 1 comprises a lens 2 for capturing an image of an object, a microphone 3 for receiving external sounds, and a flash 5 for photographing at night. It is preferable that a zoom lens, of which the focal distance is variable, is employed as the lens 2. In addition, the lens unit 1 may be arranged to be manually slid in relation to the main body 70, so that the lens unit 1 can be retracted into or extended from the main body 70. However, it is also possible to arrange the lens unit 1 to be capable of automatically appearing and disappearing in relation to the main body 70 by using a separate power source and operating a button. The state in which the lens unit 1 is extended from the main body is illustrated in FIG. 3 by way of an example. The states in which the lens unit 1 is slid and retracted into the main body 70, and in which the lens unit 1 is slid and extended from the main body 70 are further illustrated in FIGS. 4A and 4B by way of an example.

Figure 4A:
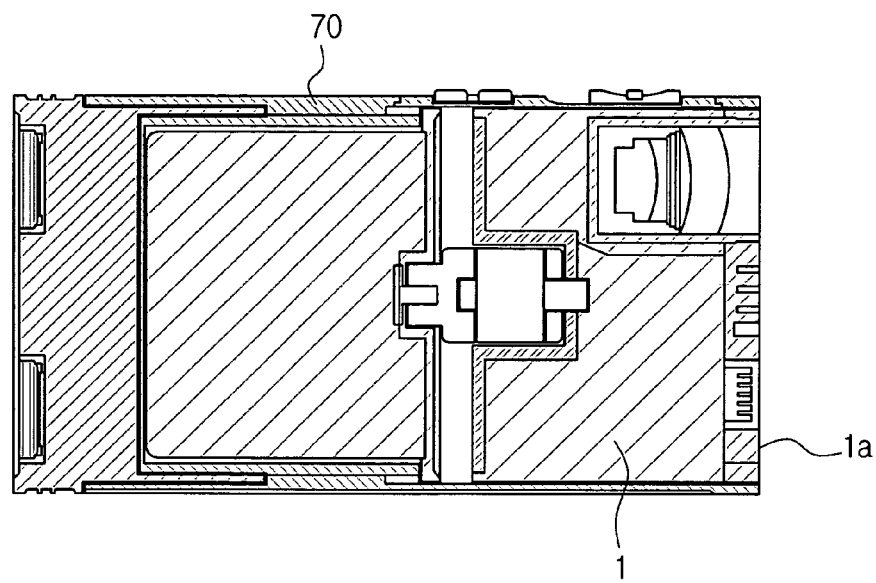
FIG. 4A is a cross-sectional view showing the appearing and disappearing type image pickup device of FIG. 1 while in a state in which the lens unit is retracted.
Figure 4B:
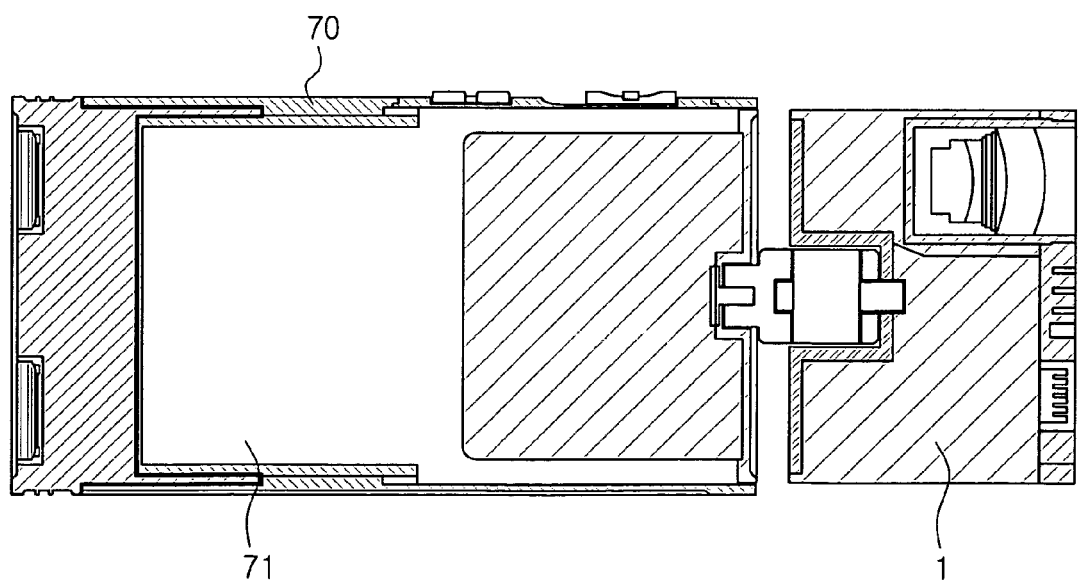
FIG. 4B is a cross-sectional view showing the appearing and disappearing type image pickup device of FIG. 1 while in a state in which the lens unit is extended.

If the lens unit 1 is extended from the main body 70 as shown in FIG. 4B, a space 71 corresponding to the extended portion of the lens unit 1 is formed in the main body 70. If the lens unit 1 is retracted into the main body 70 as shown in FIG. 4A, the front end 1a of the lens unit 1 is not exposed from the main body 70, that is, is not exposed beyond the outside contour of the main body 70. Because a power source and a power transmission arrangement for automatically retracting and extending the lens unit 1 in relation to the main body 70 can be implemented by using any technology well-known in the art, detailed configurations thereof are omitted from the drawings and are not described herein.

Figure 5:
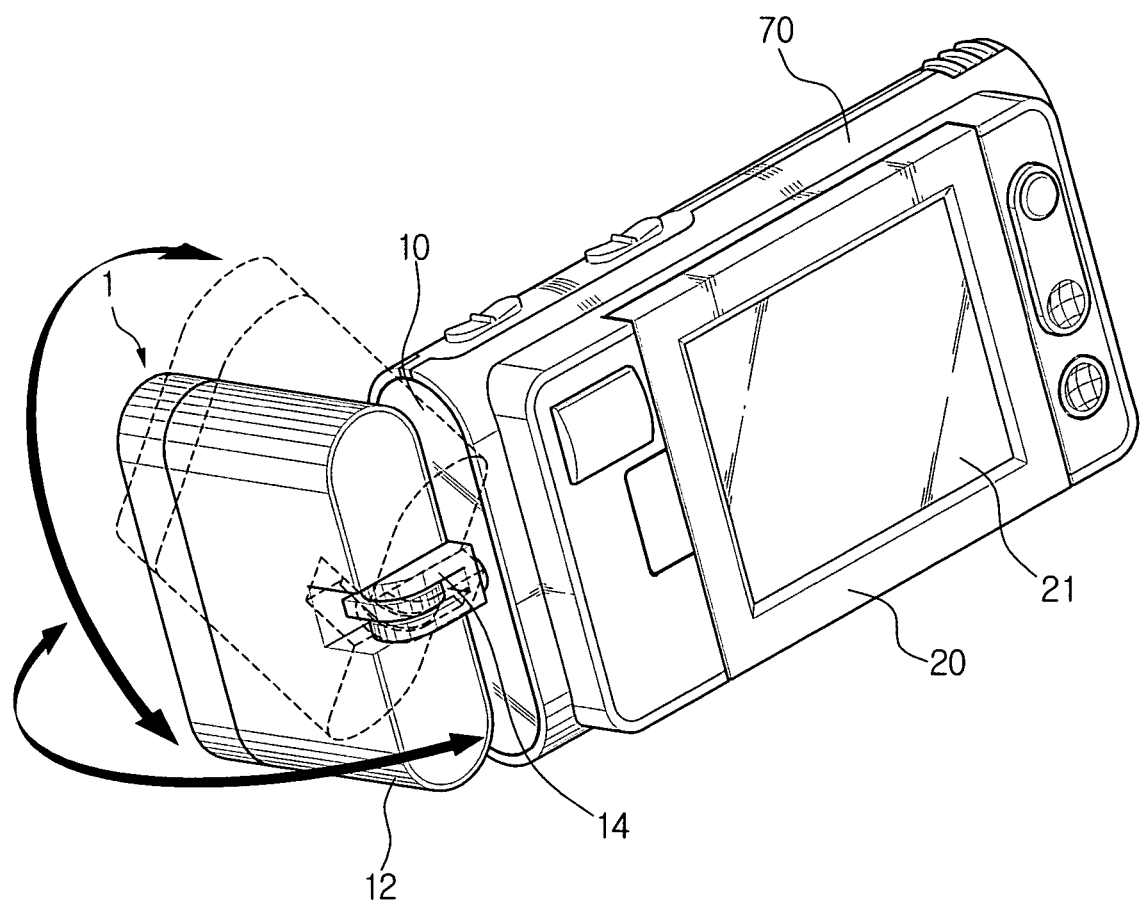
FIG. 5 is a perspective view showing the appearing and disappearing type image pickup device of FIG. 1 while in a state in which the lens unit is extended and rotated 90 degrees.

Referring to FIG. 5, in order to increase the degree of freedom in the photographing posture, the lens unit 1 may further comprise a moving unit 10 for rendering the lens unit 1 to be slidably moved in relation to the main body 70, and a rotary unit 12 installed to be rotatable in relation to the moving unit 10, wherein elements such as the lens 2 may be mounted in the rotary unit 12. If the moving unit 10 of the lens unit 1 is extended, only the rotary unit 12 is outwardly exposed from the main body 70, and the top surface of the moving unit 10 is substantially flush with one end of the main body 70. In addition, if the moving unit 10 of the lens unit 1 is retracted into the main body 70, the top surface of the rotary unit 12 is substantially flush with the end of the main body 70 without projecting from the main body 70. The rotary unit 12 and the moving unit 10 are interconnected by a hinge 14, wherein the hinge 14 may be formed in such a way that the rotary unit 12 is rotatable within a predetermined range of forward and reverse angles in relation to the moving unit 10, for example, forward within 90 degrees, and rearward within 90 degrees. Alternatively, it is also possible to form the hinge 14 in such a way that the rotary unit 12 is rotatable within a predetermined range of only up and down angles in relation to the moving unit 10, for example, upward within 180 degrees, and downward within 180 degrees. Further, it is also possible to form the hinge 14 in such a way that the rotary unit 12 is rotatable within a predetermined range of forward, reverse, up and down angles in relation to the moving unit 10, for example, forward within 90 degrees, rearward within 90 degrees, upward within 180 degrees, and downward within 180 degrees.

Figure 6:
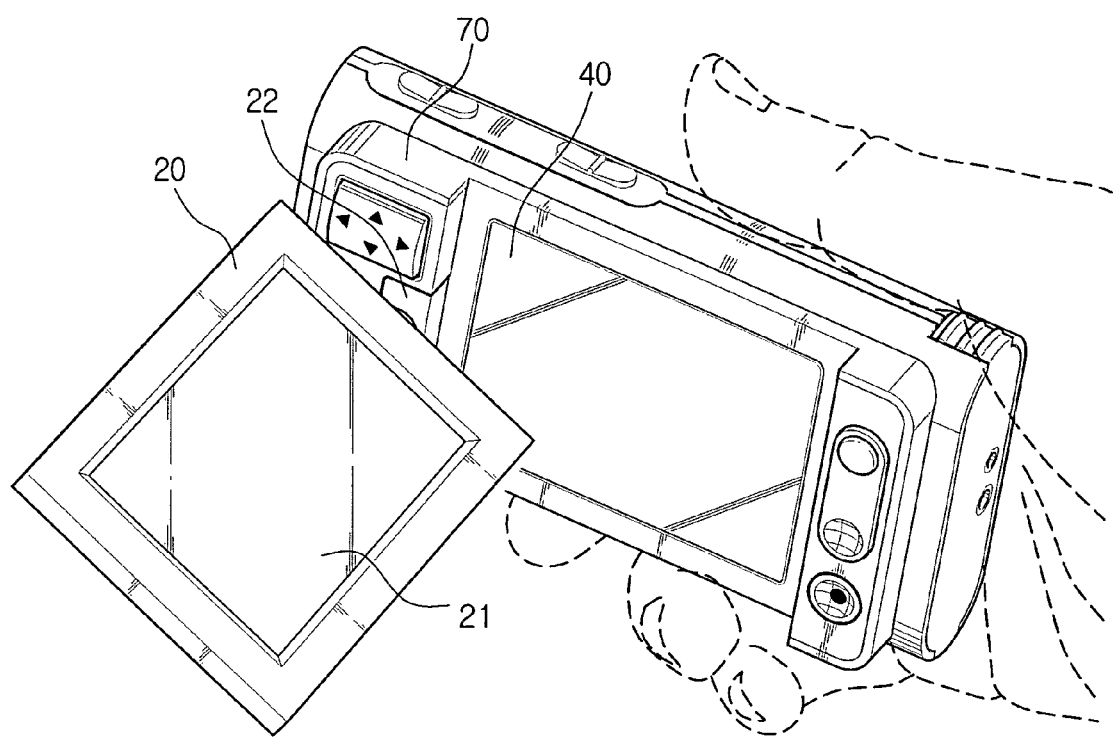
FIG. 6 is a perspective view showing the appearing and disappearing type image pickup device of FIG. 1 while an image outputting unit is open and being rotated in relation to the main body of the image pickup device.
Figure 7:
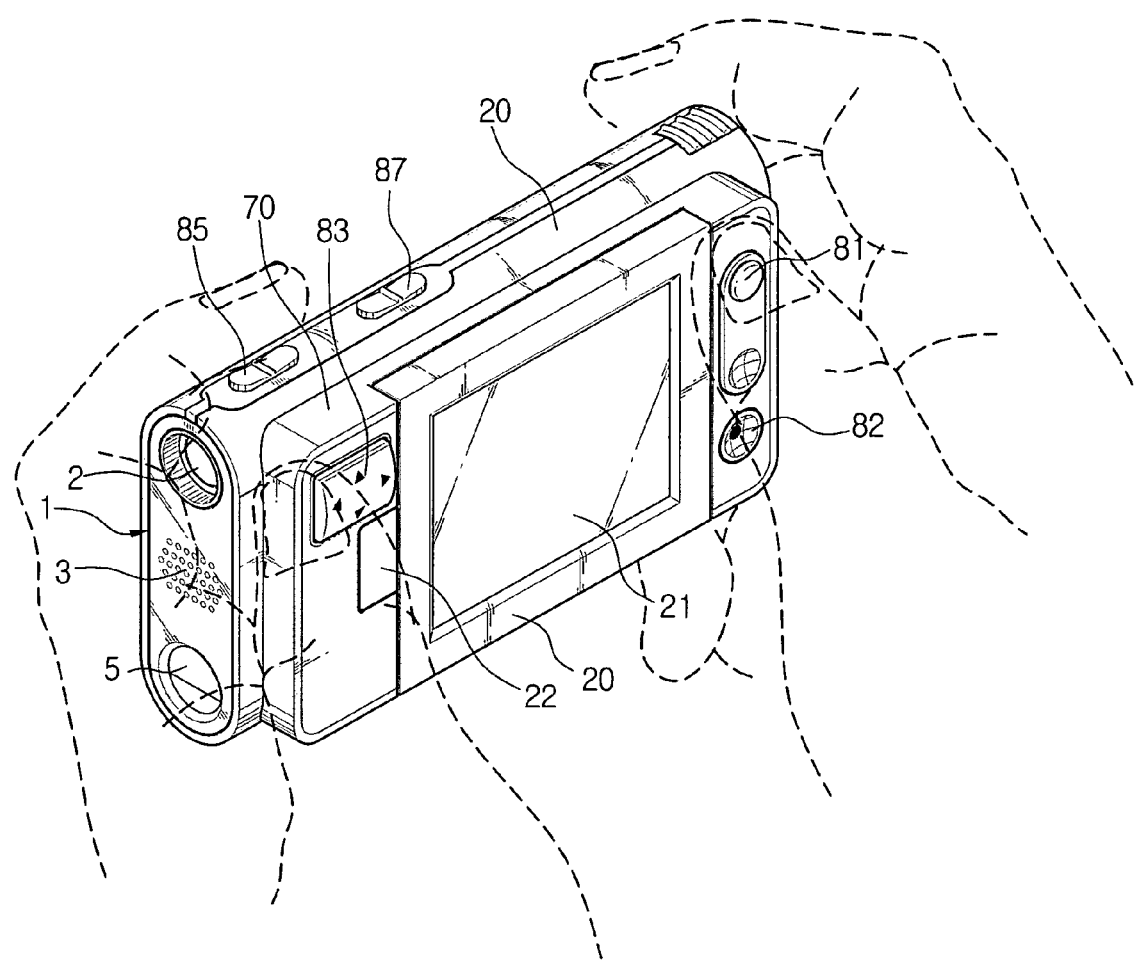
FIG. 7 is a perspective view showing the appearing and disappearing type image pickup device of FIG. 1 while in a state in which the image outputting unit is folded against the main body of the image pickup device while the screen of the image outputting unit is exposed.

The image outputting unit 20 is mounted on a side of the main body 70 to display an image captured by the lens 2. A TFT-LCD or similar device may be used for the image outputting unit 20. A hinge 22 interconnecting the image outputting unit 20 and the main body 70 allows the image outputting unit 20 to be opened within a predetermined angle and to be closed in relation to the main body 70 via a first hinge member axis. The hinge 22 also allows the image outputting unit 20 to rotate via a second hinge member axis in relation to the main body 70 while in a state in which the image outputting unit is opened about 90 degrees in relation to the body (see FIG. 6). It is preferable that the image outputting unit 20 is allowed to rotate 180 degrees or more in one direction. Furthermore, as shown in FIG. 7, it is possible to fold the image outputting unit 20 against the main body 70 while in a state in which the image outputting unit 20 is opened about 90 degrees to the main body 70 and then rotated 180 degrees in one direction, so that the image outputting unit 20 can be folded against the main body 70 in the state in which the screen 21 is outwardly exposed.

Figure 8:
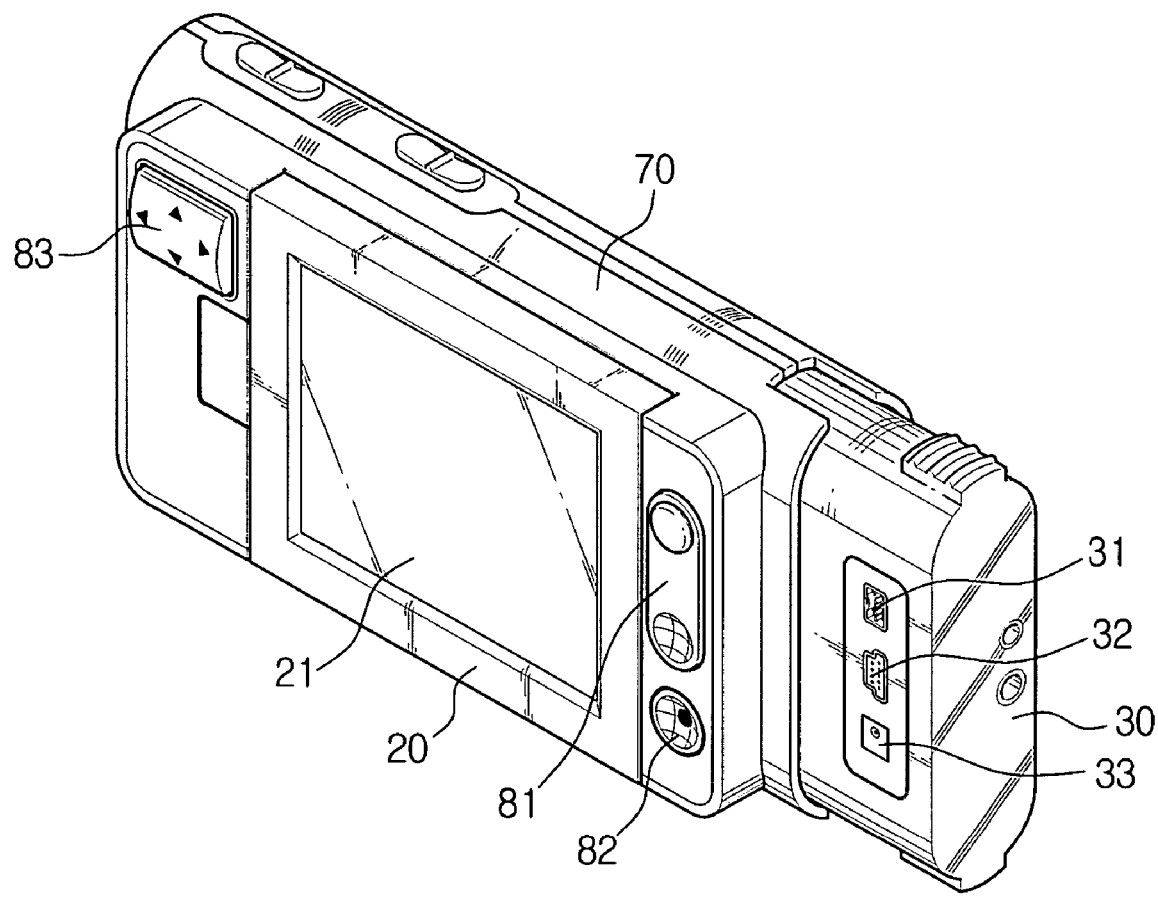
FIG. 8 is a perspective view showing the appearing and disappearing type image pickup device of FIG. 1 while in a state in which a terminal connection unit is extended.

The terminal connection unit 30 is provided in the other end of the main body 70 opposite to the side of the main body 70 where the lens unit 1 is installed, and can be slid in relation to the main body 70 thus being retracted into the main body 70. Although, the sliding movement of the terminal connection unit 30 of the main body 70 can be performed either automatically or manually, the terminal connection unit 30 of the exemplary embodiment is manually extended from or retracted into the main body 70. FIG. 8 shows the state in which the terminal connection unit 30 is extended from the main body 70.

The terminal connection unit 30 may be provided with various terminals according to the functions of the image pickup device. In the exemplary embodiment, the terminal connection unit 30 is provided with a DC jack 33 for charging the battery 40 (see FIG. 6) or allowing direct connection of a DC power source for using instead of the battery, and a USB connector 31 and a serial connector 32, which are employed as computer connection connectors for connecting the image pickup device to a computer. Accordingly, when charging the battery 40 of the image pickup device or connecting the image pickup device to a computer for exchanging data, a user may use the image pickup device while in a state in which the terminal connection unit 30 is extended out of the main body 70 and in like fashion, the user may then use the image pickup device for various other tasks while in a state in which the terminal connection unit 30 is retracted into the main body 70.

The recording unit 50 (see FIG. 2) serves to record an image captured by the lens unit 1 to a recording medium, and any number of recording units employed in a conventional digital camcorder can be applied to the inventive image pickup device. Accordingly, the recording unit 50 may comprise a recording means for recording various data to a recording medium, and medium receiving means for receiving/discharging a recording medium in the main body 70, wherein the structure of the recording unit 50 is varied depending on the type of recording medium being used. A digital cassette tape, memory card, CD, DVD, hard disc or the like, can be used as such a recording medium.

The control unit 60 (see FIG. 2) serves to control various components as described above so that the image pickup device can perform various functions. That is, the control unit 60 controls the lens unit 1, converts an image of an object captured by the lens unit 1 into a digital signal to be displayed on the image outputting device 20, and further controls the recording unit 50 so that a certain image is recorded in a recording medium depending on user's selection. In addition, the control unit 60 controls the moving unit 10 so that the lens unit 1 is selectively extended from or retracted into the main body 70. Moreover, the control unit 60 executes functions substantially the same as those of a control unit of a conventional PDA which is well-known in the art so that the image pickup device can function as a PDA. The control unit 60 also controls the image outputting device 20 and peripheral buttons 81, 82, and 83 so that the image pickup device can provide various games as a game machine. A sound signal transmission unit 62 (see FIG. 2) is also connected to the control unit 60, so that the user can listen to data in voice form at the time of implementing a game or MP3 music file stored in the memory. The sound transmission unit 62 may employ an earphone jack or a Bluetooth module so that the user can listen to music or the like using a wired earphone module or a wireless earphone.

The battery 40 serves to supply required power to the respective components described above, and a rechargeable battery may preferably be used as the battery 40. The battery 40 is mounted in the main body 70 so that it is positioned under the image outputting unit 20 when the image outputting unit 20 is folded against the main body 70 (see FIG. 6).

The main body 70 serves to support all the components described above so that they can retain their relative positions, and forms the frame of the image pickup device. The main body 70 is preferably shaped so that the user can grasp opposite ends of the main body 70 and manipulate various buttons 81, 82, and 83 which are provided in the vicinity of the image outputting unit 20 as shown in FIG. 7. The lens unit 1 is mounted at one end of the main body 70 to be capable of appearing and disappearing in relation to the main body 70 by a sliding movement, and the terminal connection unit 30 is mounted at the other end of the main body 70 to also be capable of appearing and disappearing in relation to the main body 70 by a sliding movement. In addition, the image outputting unit 20 is rotatably connected to one side of the main body 70 (the front side of the main body 70 in FIG. 7) through the hinge 22, so that the image outputting unit 20 can be opened or closed in relation to the main body 70, and can be further rotated within a predetermined range of angles once opened. A cursor button 83 may also be provided for positioning a cursor displayed on the screen 21 and can be disposed upon the device in the vicinity of the image outputting unit 20. A zoom button 81 may also be provided for adjusting the focus of the lens 2, and a recording button 82 for recording an image captured by the lens 2 in a recording medium, and can both be disposed in the vicinity of the image outputting unit 20. If the zoom button 81 and the recording button 82 are used for other functions, they can be suitably configured for such alternate functions as required.

Figure 9:
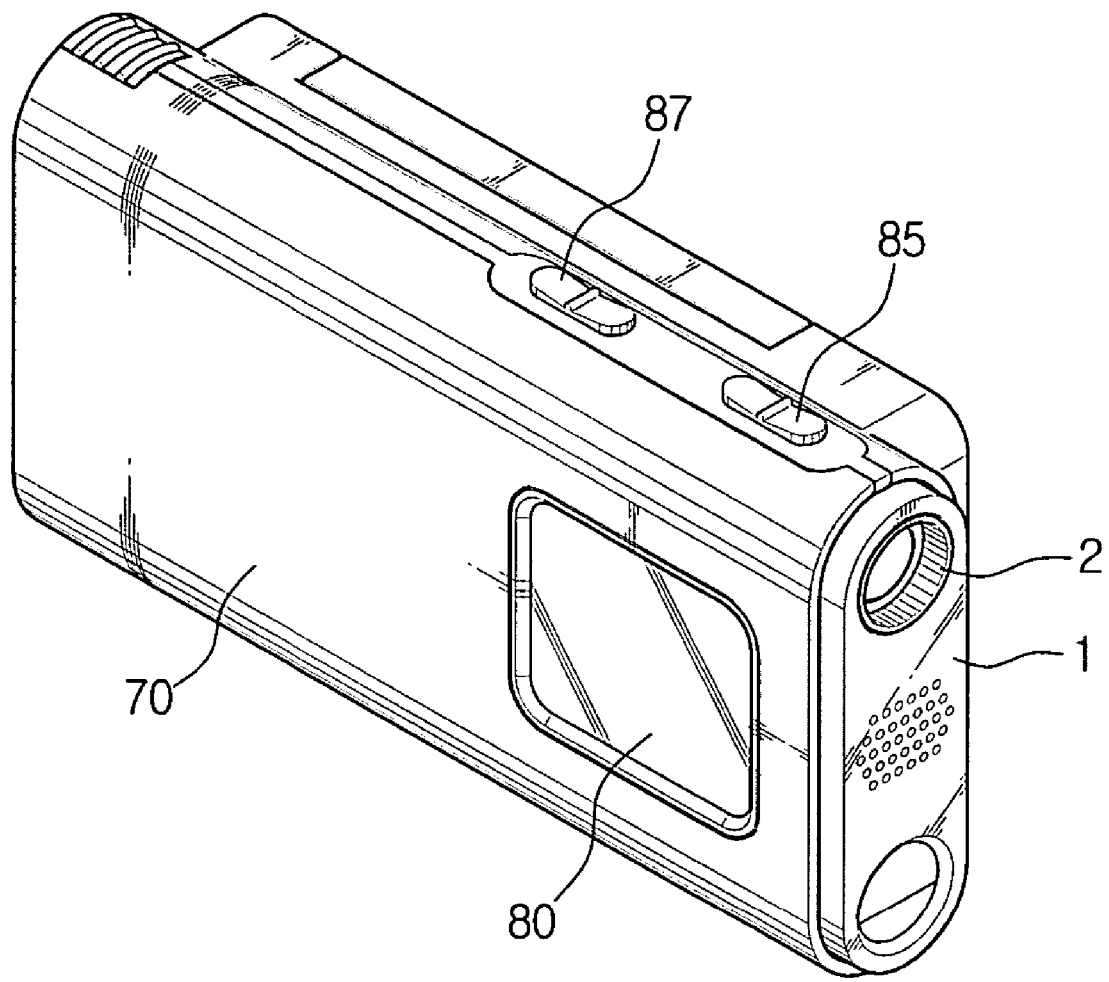
FIG. 9 is a perspective view showing a touch pad unit of the appearing and disappearing type image pickup device of FIG. 1.

In addition, the other side of the main body 70, that is, the rear side of the main body 70, may be provided with a touch pad 80 as shown in FIG. 9. The touch pad 80 is substantially the same as a conventional touch pad employed in a device such as a notebook computer, and can serve as a switch for adjusting the focus of the zoom lens 2 when the image pickup device is used as a camcorder. Accordingly, the touch pad 80 is configured in such a manner that if the touch pad 80 is scrolled to one side (e.g., forward), the lens 2 is zoomed in, and if the touch pad 80 is scrolled to the other side (e.g., rearward), the lens 2 is zoomed out. In addition, the touch pad 80 can be set to be used as a mouse-like touch pad for a conventional notebook computer when the image pickup device is connected to such a computer. A function selection button 85 can also be provided for selecting functions such as photographing functions, reproducing functions, and PDA functions, and a button 87 can also be provided for directing the lens unit 1 to appear and disappear. Such buttons 85 and 87 can be provided at convenient locations, such as along the top of the main body 70.

A exemplary operation of the inventive appearing and disappearing type image pickup device having the components described above will now be described in greater detail with reference to accompanying drawings.

First, if it is desired to use the inventive image pickup device as a camcorder, the function selection button 85 is positioned at the "photographing" mode position. The lens unit 1 may then capture an image while in a state of being retracted into the main body 70 as shown in FIG. 1. The lens unit 1 may be also used while in a state of being extended from the main body 70 as shown in FIG. 3, or while in a state of being extended from the main body 70 and rotated to a predetermined angle in relation to the main body 70 as shown in FIG. 5. A desired image is recorded in a recording medium by the image recording unit 50 once the recording button 82 is pressed, preferably after the focus of the lens 2 is adjusted using the zoom button 81 or the touch pad 80.

If it is desired to use the inventive image pickup device as a game machine, the image outputting unit 20 is opened about 90 degrees from the main body 70, then rotated about 180 degrees in relation to the main body 70, and then folded against the main body 70 so that the screen 21 is outwardly exposed as shown in FIG. 7. The function selection button 85 is then positioned at the "PDA" mode position. In this state, the user may grasp the opposite ends of the main body 70 and enjoy a game using the cursor button 83, recording button 82, zoom button 81, or the like, provided at left and right sides of the image outputting screen 20 as shown in FIG. 7. That is, because the lens unit 1 is not extended from the main body 70, it is convenient to manipulate various buttons while grasping the main body 70 with one or both hands.

When it is desired to use the inventive image pickup device as a PDA, the function selection button 85 is positioned at the "PDA" mode position, and the screen 21 of the image outputting unit 20 is positioned to be outwardly exposed as in the case of being used as a game machine. It is then possible to input or view various information using the cursor button 83. It is further possible to perform direct inputting on the screen 21 using a stylus pen.

If it is desired to connect the inventive image pickup device to a computer so as to exchange data, the terminal connection unit 30 is extended from the main body 70 and then the USB or serial connector 31 or 32 is connected to the computer. It is then possible to easily upload data stored in a memory or a recording medium to the computer, or to download the data stored in the computer to the image pickup device. As the touch pad 80 can also serve as a mouse, the user can conveniently control the computer which is connected to the image pickup device.

In addition, if it is desired to drive the image pickup device using an external power source, it is possible to extend the terminal connection unit 30 from the main body 70, and then connect the DC jack 33 to a DC adaptor. With the DC adaptor being connected in this manner, it is possible to charge the battery 40.

If it is desired to use the inventive image pickup device as an MP3 player, the inventive image pickup device is turned to the same state as the "PDA" mode, and then the "music" mode may be selected from a listing of modes displayed on the image outputting unit 20, thereby reproducing music. The user may then listen to music using a wired or wireless earphone, depending on the type of sound transmission unit 62 provided in the main body 70.

While exemplary embodiments of the present invention have been shown and described in order to illustrate the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. An appearing and disappearing type image pickup device comprising:

a lens unit for capturing an image of an object, the lens unit comprising a rotary unit such that the lens unit is rotatable within a predetermined range of angles about an axis perpendicular to the axis of the lens when extended from the main body, and a rotary unit such that the lens unit is rotatable within a predetermined range of angles about an axis parallel to the axis of the lens when extended from the main body;

a main body for slidably receiving the lens unit in one end of the main body such that the lens unit is capable of substantially appearing from and disappearing within the main body and capturing an image while at each slidable position;

an image outputting unit provided at one side of the main body;

a recording unit provided in the main body, wherein an image captured by the lens unit is recorded in the recording unit; and a battery installed in the main body for supplying power to the respective components of the image pickup device.

2. An image pickup device as claimed in claim 1, wherein the lens unit further comprises a slidable moving unit such that the lens unit is capable of automatically appearing from and disappearing within the main body.

3. An image pickup device as claimed in claim 1, further comprising a terminal connection unit slidably disposed within the other end of the main body such that the terminal connection unit is capable of substantially appearing from and disappearing within the main body.

4. An image pickup device as claimed in claim 3, wherein the terminal connection unit comprises at least one of a DC jack and a computer connection connector.

5. An image pickup device as claimed in claim 1, wherein the image outputting unit further comprises:
- a first hinge member which allows the image outputting unit to be opened and closed in relation to one side of the main body, the image outputting unit being provided at the one side of the main body; and
- a second hinge member which allows the image outputting unit to rotate 180 degrees or more in relation to the one side of the main body while in a state in which the image outputting unit is substantially vertically opened in relation to the main body,
- wherein the first and second hinge members are configured as a single hinge disposed between the image outputting unit and the main body.

6. An image pickup device as claimed in claim 5, wherein the battery is positioned under the image outputting unit while in a state in which the image outputting unit is closed in relation to the main body.

7. An image pickup device as claimed in claim 1, further comprising a touch pad disposed upon another side of the main body and which is capable of adjusting the lens unit.

8. An image pickup device as claimed in claim 7, wherein the lens unit further comprises a zoom lens.

9. An appearing and disappearing type image pickup device comprising:
- a lens unit for capturing an image of an object, the lens unit having a zooming function, the lens unit comprising a slidable moving unit such that the lens unit is capable of substantially appearing from and disappearing within the main body, and a rotary unit such that the lens unit is rotatable in at least one of a forward, reverse, up, and down direction in relation to the moving unit within a predetermined range of angles;
- a main body for slidably receiving the lens unit in one end of the main body such that the lens unit is capable of automatically appearing from and disappearing within the main body and capturing an image while at each slidable position;
- a terminal connection unit slidably disposed in the other end of the main body such that the terminal connection unit is capable of substantially appearing from and disappearing within the main body;
- an image outputting unit provided at one side of the main body;
- a touch pad provided at another side of the main body for adjusting the focus of the lens unit;
- a recording unit provided in the main body, wherein an image captured by the lens unit is recorded in the recording unit; and
- a battery installed in the main body for supplying power to the respective components of the image pickup device.

10. An image pickup device as claimed in claim 9, wherein the battery is disposed under the image outputting unit.

11. An image pickup device as claimed in claim 9, wherein the lens unit further comprises a zoom lens.

12. An image pickup device as claimed in claim 9, wherein the main body further comprises:
- a cursor button arranged to allow a user to grasp the main body and manipulate a cursor displayed on a display screen of the image outputting unit while in a state in which the image outputting unit is folded against the main body.

13. An image pickup device as claimed in claim 12, wherein the outputting unit is folded against the main body so that the display screen is exposed.

14. An image pickup device as claimed in claim 9, further comprising at least one of a personal digital assistant (PDA) function, a game device function and a Moving Picture Experts Group Audio Layer 3 (MP3) function, wherein the image pickup device can selectively function as a PDA, game device and MP3 player.

* * * * *